United States Patent [19]
Smith

[11] Patent Number: 5,335,099
[45] Date of Patent: Aug. 2, 1994

[54] VEILING GLARE CONTROL HOLOGRAPHIC WINDSHIELD

[75] Inventor: Ronald T. Smith, Torrance, Calif.

[73] Assignee: Hughes Aircraft Company, Los Angeles, Calif.

[21] Appl. No.: 994,733

[22] Filed: Dec. 22, 1992

[51] Int. Cl.$^5$ .................... G02B 5/32; G02B 27/42; G03H 1/00
[52] U.S. Cl. .................... 359/15; 156/99; 359/14; 359/361; 359/575
[58] Field of Search .................... 359/3, 13, 14, 15, 24, 359/350, 361, 575, 630; 156/99

[56] References Cited

U.S. PATENT DOCUMENTS

| | | | |
|---|---|---|---|
| 4,973,132 | 11/1990 | McDonald et al. | 359/15 |
| 4,981,332 | 1/1991 | Smith | 359/13 |
| 4,998,784 | 3/1991 | Freeman et al. | 359/15 |
| 5,066,525 | 11/1991 | Nakamachi et al. | 359/13 |
| 5,138,469 | 8/1992 | Wood et al. | 359/13 |
| 5,138,470 | 8/1992 | Moss et al. | 359/15 |
| 5,153,751 | 10/1992 | Ishikawa et al. | 359/13 |
| 5,162,927 | 11/1992 | Moss et al. | 359/24 |
| 5,196,951 | 3/1993 | Wreede | 359/15 |
| 5,214,425 | 5/1993 | Wreede | 359/24 |
| 5,243,449 | 9/1993 | Smith | 359/630 |

Primary Examiner—Martin Lerner
Attorney, Agent, or Firm—L. A. Alkov; W. K. Denson-Low

[57] ABSTRACT

A zero-degree mirror reflection hologram is embedded into a vehicle windshield to reduce veiling glare. The hologram partially reflects sunlight in the visible wavelength range incident on the windshield between 0 and substantially 70 degrees, and therefore blocks a substantial portion of visible sunlight that would otherwise pass through the windshield and reflect off the dashboard. The portion of light that does reflect off the dashboard which could enter the driver's eyebox does not reflect appreciably off the hologram because the hologram reflection peak is in the ultraviolet at high off-axis angles.

24 Claims, 6 Drawing Sheets

FIG. 6
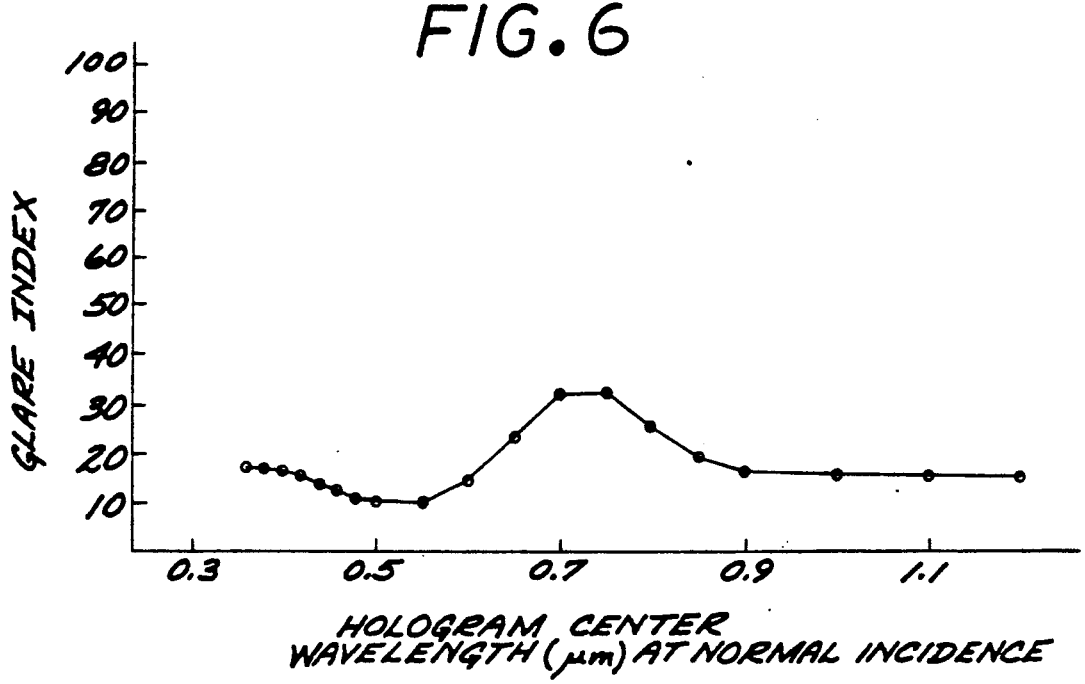
HOLOGRAM CENTER WAVELENGTH (μm) AT NORMAL INCIDENCE
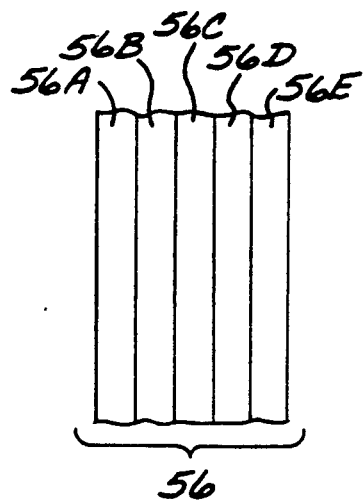
FIG. 7

VEILING GLARE CONTROL HOLOGRAPHIC WINDSHIELD

BACKGROUND OF THE INVENTION

The present invention relates to holographic windshields, and more particularly to such windshields having the capability of reducing veiling glare.

FIG. 1 illustrates the problem of veiling glare from conventional automobiles. Visible sunlight passes through the standard tinted windshield, reflects off of the dashboard, reflects off of the windshield and into the driver's eyebox as veiling glare. The driver sees a virtual image of the lit dashboard beyond his windshield that "veils" or impedes his ability to see the road ahead of him. In order to minimize veiling glare, the car companies have been forced to use dark colors on the dashboard and a corrugated, non-glossy texture on the surface of dash. Car designers would prefer to have the flexibility to use lighter dashboard colors and/or more glossy or reflective dashboard finishes but are prevented from doing so because of veiling glare.

Therefore, it would be advantageous to provide a holographic windshield which reduced veiling glare without significantly disturbing the seethrough of the windshield.

SUMMARY OF THE INVENTION

A veiling glare holographic windshield for reduction of veiling glare comprises inner and outer windshield singlets, and a zero-degree mirror reflection hologram having a high reflectance zone in the visible spectral range at normal incidence disposed between the two singlets. The reflection hologram is characterized by a bandwidth of as much as 150 nm, and is fabricated to partially reflect sunlight in the visible range and incident on said windshield at angles of incidence between 0 and substantially 70 degrees. Preferably, the reflection hologram is characterized by a hologram reflection peak which is in the ultraviolet range at high off-axis angles of incidence. Such a holographic windshield blocks a substantial portion of visible sunlight that would otherwise pass through and reflect off the dashboard.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 4–6 are graphs illustrating the glare index parameter for a hologram windshield with particular bandwidth and efficiency characteristics as a function of wavelength.

FIG. 7 illustrates an embodiment of the hologram of FIG. 2 as an assembly of several zero-degree mirror holograms.

DETAILED DESCRIPTION OF THE PREFERRED EMBODIMENT

Figure 1:
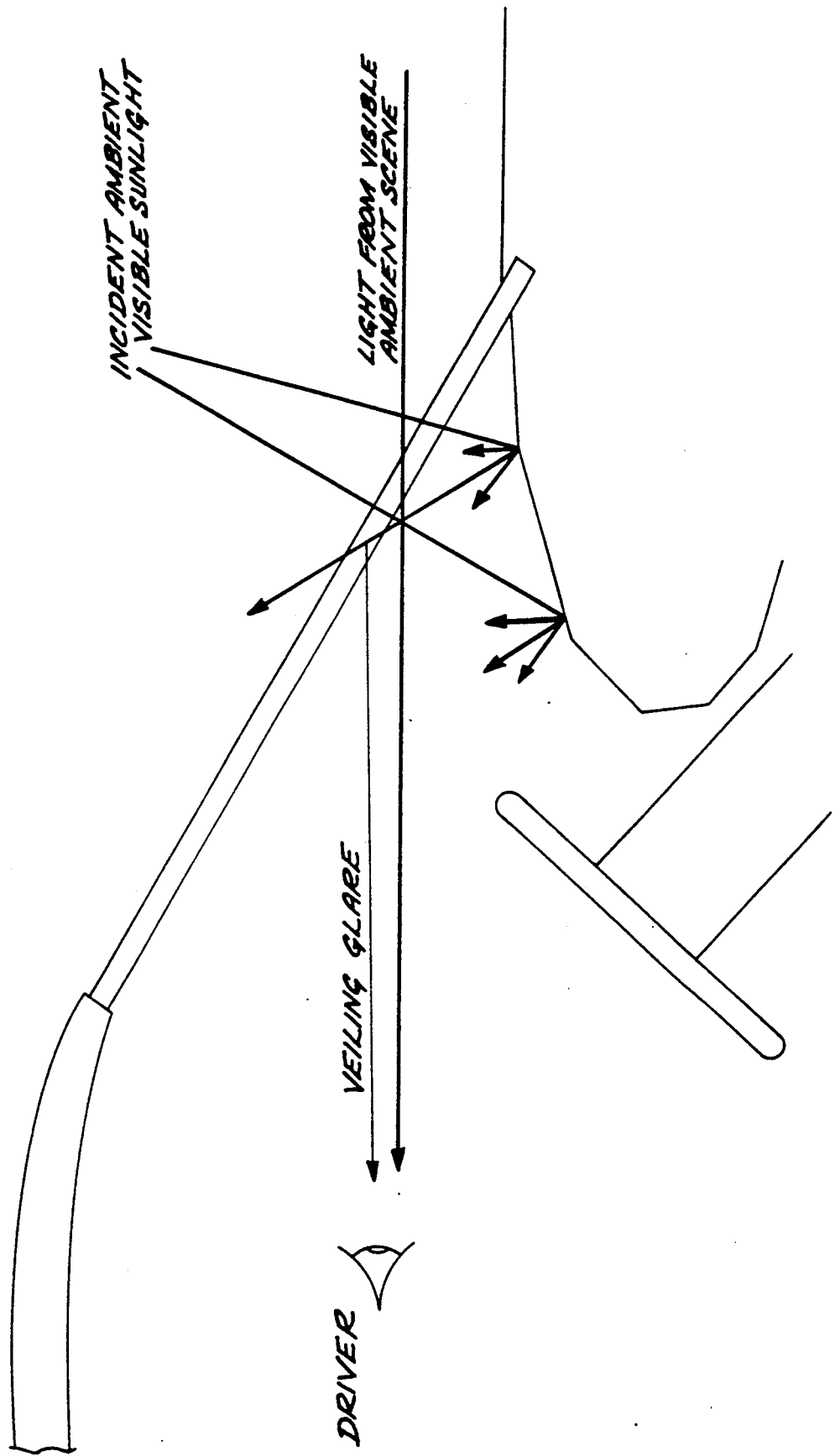
FIG. 1 is a simplified diagrammatic view illustrating the problem of veiling glare in a conventional automobile.
Figure 2:
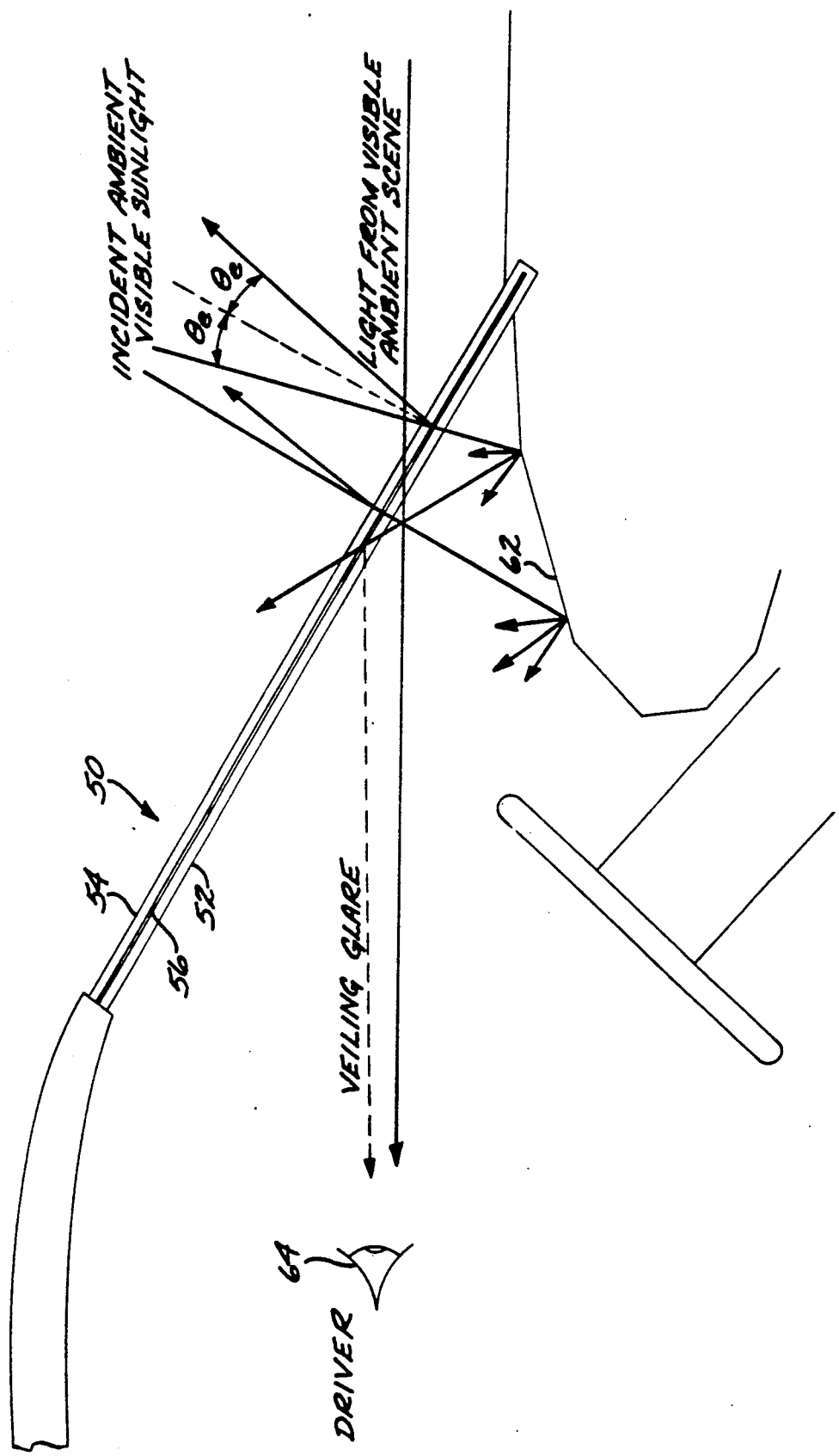
FIG. 2 illustrates a vehicle comprising a veiling glare control holographic windshield in accordance with this invention.

FIG. 2 illustrates a veiling glare control holographic windshield 50 in accordance with this invention. The windshield 50 comprises inner and outer singlets 52 and 54 in the conventional manner. Typically at least one singlet is fabricated of a tinted glass or other windshield material.

The windshield 50 has incorporated therein between the singlets 52 and 54 a zero-degree mirror reflection hologram 56 whose bandwidth is as broad as 100 nm or more, and whose high reflectance zone is in the visible at normal incidence. A zero-degree mirror reflection hologram is a mirror reflection hologram with fringes parallel to the hologram surface. This hologram is preferably made of photopolymer film. The HRF600 and the HRF700 films produced by E.I. duPont de Nemoirs Company, or the DMP182 film produced by Polaroid Corporation are suitable for the purpose of fabricating the zero-degree mirror reflection hologram.

The hologram 56 is embedded within the windshield between the singlets 52 and 54. Since this hologram layer does not need to perform any imaging function it will typically not be necessary to protect it with any polyvinyl alcohol (PVA) barrier layer to prevent "orangepeel" corrugation or peak wavelength positive shift from occurring due to contact with the polyvinyl butyral (PVB) layer conventionally disposed between the singlets. However, such a barrier layer can be included in the windshield.

Figure 3:
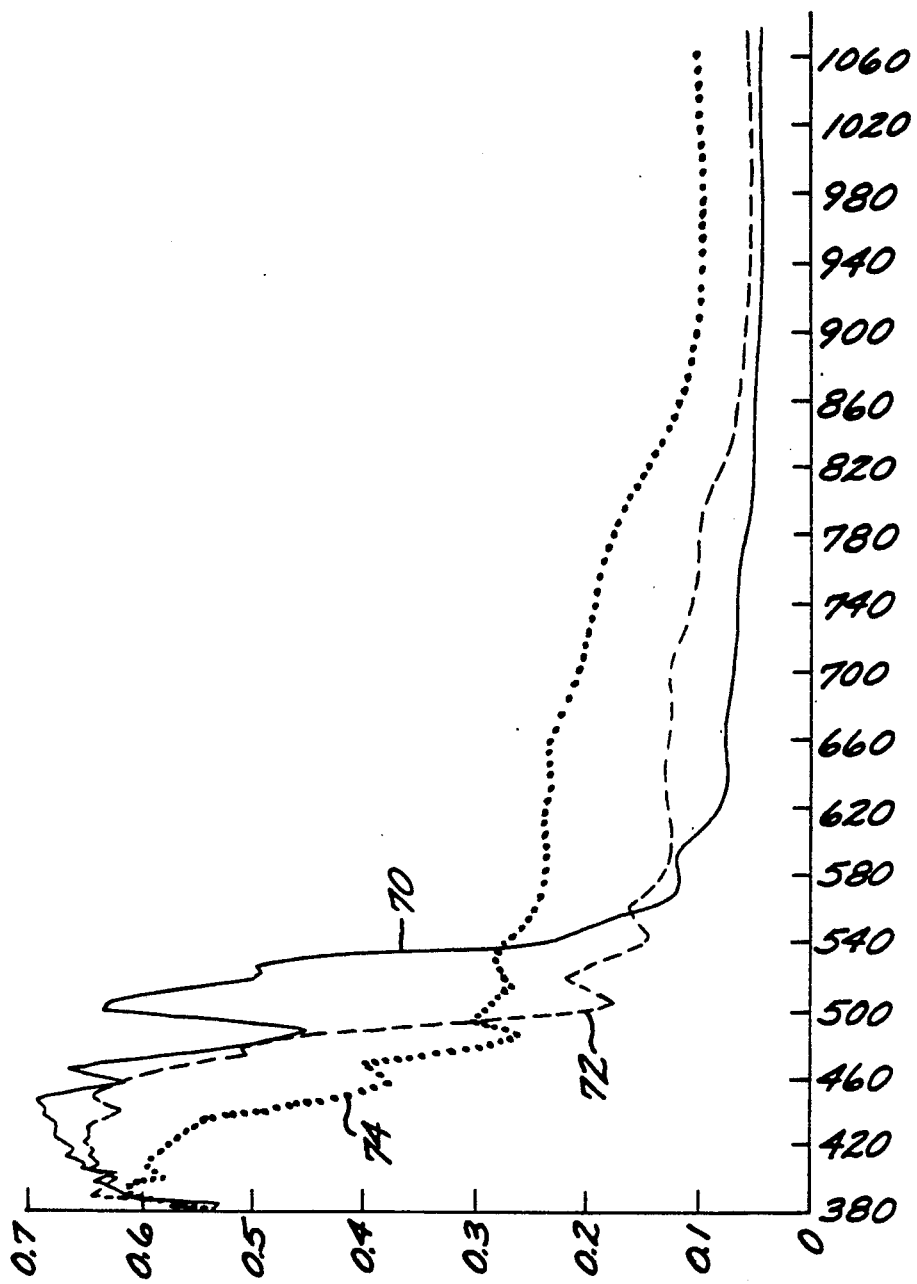
FIG. 3 shows the relative unnormalized reflectance of an exemplary embodiment of a solar control hologram used in the windshield of FIG. 2 as a function of wavelength for several angles of incidence.

The solar control hologram 56 exhibits a reflectance versus wavelength spectrum that is characterized by a high reflectance over a well-defined wavelength band. This reflectance is a maximum at the "reflection peak" or "efficiency peak." The reflectance is defined as the reflected energy divided by the total energy. The wavelength at which the reflection peak occurs is called the "peak wavelength" or "hologram center wavelength." The peak wavelength varies with incident angle; as the incident angle moves away from normal, the peak wavelength drops. FIG. 3 is a graph illustrating the relative unnormalized reflectance of an exemplary embodiment of the hologram 56 as a function of wavelength for s-polarized light and for three angles of incidence. Line 70 shows the reflectance for light incident at 0°. Line 72 shows the reflectance for light incident at 40°. Line 74 shows the reflectance for light incident at 68°.

The glare index is a parameter defined specifically for the case when the windshield is 68 degrees from vertical, and the sun is 22 degrees from vertical, and its energy strikes the windshield at normal. The glare model assumes that the dashboard reflects all of the transmitted solar light back up the windshield, to be reflected again (this time by the windshield glass) to the driver. The glare index GI is defined as:

$$GI = 100 \frac{\int_{380}^{780} T_0(1)R_{68}(1)I_c(1)Y(1)d1}{\int_{380}^{780} I_c(1)Y(1)d1}$$

where 1 is the wavelength of light in nanometers, $I_C$ is the intensity of the CIE-C standard illuminant, Y is the photopic eye response at a given wavelength, the windshield transmission is measured at normal $T_O$, and a term for the windshield reflectance at the viewing angle is added, $R_{68}$.

Figure 4:
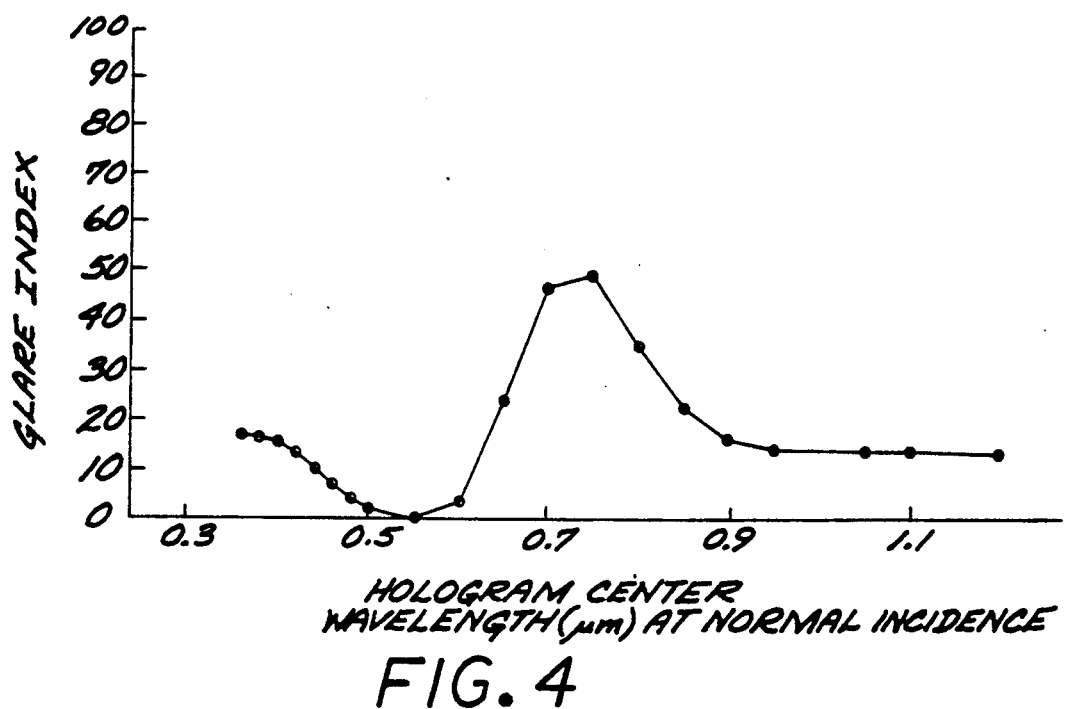
Figure 5:
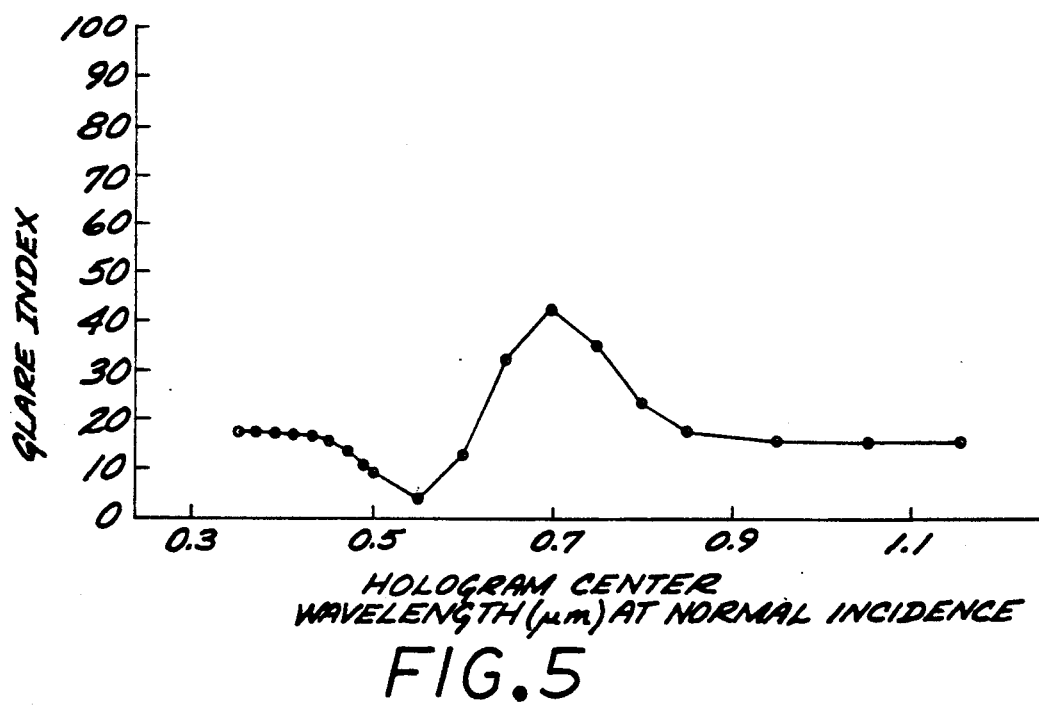

The absolute highest glare index possible is 100%, and the absolute lowest possible is 0%. For one type of conventional windshield, the glare index for sun normal to a windshield 68° from vertical is 14%. FIG. 4 displays the glare index of a 200 nm bandwidth, 100% diffraction efficiency hologram as a function of hologram center wavelength. FIG. 5 displays the same data for a holographic windshield whose bandwidth in only 100 nm, but is 100% efficient. FIG. 6 plots the performance of a windshield whose hologram has a bandwidth of 200 nm and an efficiency of 50%. In FIG. 4 the glare index reaches a minimum of about 0% when the hologram peak wavelength is about 550 nm, and hologram efficiency of 100%. In FIG. 5 the glare index minimum is about 5% at 550 nm, for a hologram bandwidth of 100 nm and an efficiency of 100%. In FIG. 6, with a bandwidth of 200 nm, but an efficiency of 50%, the glare index minimum is only 10% and has shifted down to about 510 nm. Of the three, the best hologram specification for reducing veiling glare is therefore a hologram with 100% peak diffraction efficiency, a 200 nm bandwidth, and a 550 nm peak wavelength.

To fabricate a zero-degree reflection hologram, a piece of photopolymer film (consisting of a Mylar cover layer and the actual photopolymer layer) is roll-laminated onto a first-surface mirror so that the photopolymer layer is in contact with the first mirror. The self-adhesiveness of the photopolymer layer causes it to adhere well to the mirror. A collimated beam of laser light illuminates the Mylar side of the hologram film at an angle T. The beam passes through the hologram film layer, reflects off the mirror, back through the hologram film layer and Mylar, and out into space. The interference between the incident and reflected waves creates a standing wave pattern whose fringes are parallel to the plane of the film. This standing wave pattern is recorded in the film as a zero-degree reflection hologram. The angle T and the wavelength of the laser beam is chosen so that the resultant zero-degree reflection hologram has a desired peak wavelength on playback.

Using the DuPont HRF700 or HRF600 films, the hologram 56 may be fabricated by recording several zero-degree mirror holograms, each of which has a 30–40 nm bandwidth, a near 100% peak efficiency, and a peak wavelength which is different for each hologram. The peak wavelengths are chosen such that when the several holograms are laminated together, as illustrated in FIG. 7 to form hologram 56, the result is a reflectance of near 100% from 390 nm to 540 nm. Normally, after holographic exposure, a hologram plate is UV cured, then baked in an oven. The conventional structure that is baked is a glass substrate, the photopolymer hologram layer, and a Mylar cover layer. Baking using this configuration normally results in a swelling of the film and a consequent increase in peak wavelength. Baking the hologram layer without a cover normally results in a shrinkage of the film and consequent decrease in the peak wavelength. Not baking the hologram layer results in no change in peak wavelength. Therefore, by choosing one of these three methods, one can either cause an increase, no change, or decrease to the peak wavelength. If the holograms are labelled 56A, 56B, 56C, 56D and 56E from the lowest peak wavelength to the highest peak wavelength, then holograms 56A and 56B are exposed at 457 nm and then baked with no cover to drive the peak wavelength down below 457 nm. Hologram 56C is exposed at 457 nm but not baked, hologram 56D is exposed at 488 nm but not baked, and hologram 56E is exposed at 514.5 nm but not baked.

Figure 8:
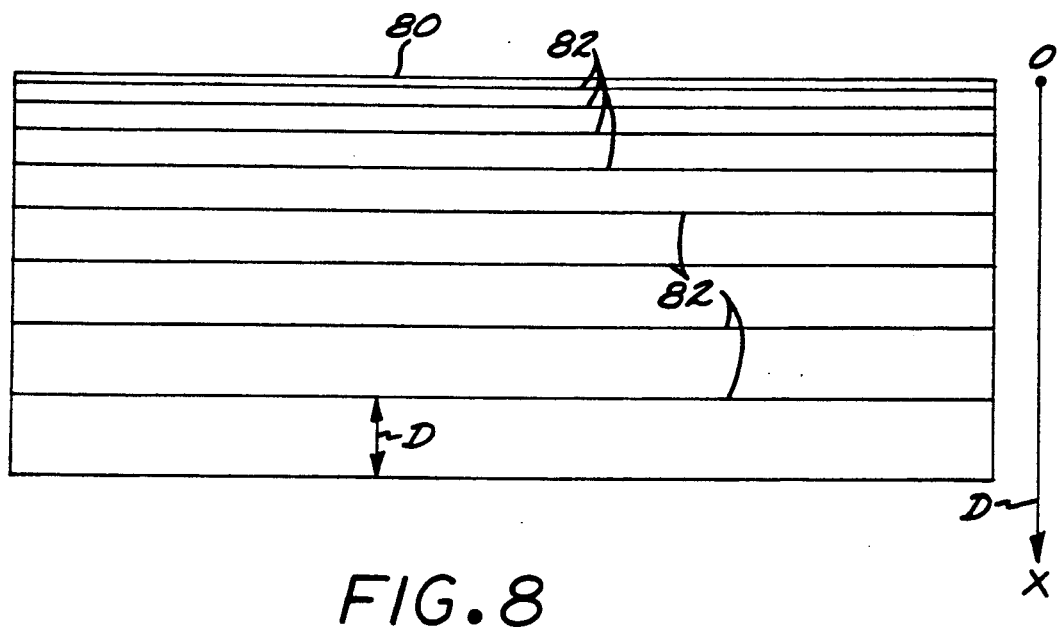
FIG. 8 shows the fringe spacing of a chirped zero-degree mirror reflection hologram.

The reflection hologram can be designed to be "chirped," i.e., the fringe spacingincreases monotonically from one side of the hologram to the other side, as illustrated in FIG. 8. In this way the spectral bandwidth of the hologram can be made larger to minimize the amount of visible light entering the vehicle and to reduce the thermal radiation entering the car. In addition, it has been found that the off-axis reflectance of chirped holograms may deteriorate much more rapidly than what is predicted for a standard sinusoidal reflection hologram using the analysis set forth in "Coupled Wave Theory for Thick Hologram Gratings," H. Kogelnik, Bell System Technical Journal, Vol. 48, No. 9, November 1969, pages 2909 et seq. This is apparently due to the fact that, because the hologram profile deviates from sinusoidality, the individual fringes do not constructively interfere at off-axis angles. Therefore, chirping can provide a hologram whose maximum high reflectance wavelength is even higher than 520 nm at normal incidence, whose spectral bandwidth is broadened, and yet whose transmittance at the viewing angle does not result in seethrough discoloration.

Figure 9:
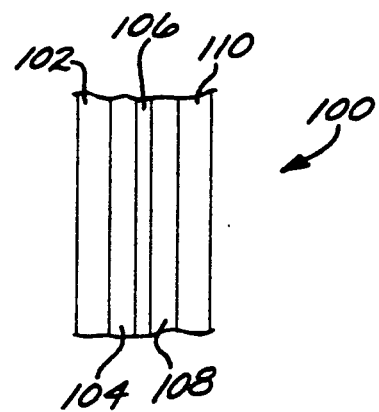
FIG. 9 shows an exemplary embodiment of a windshield embodying the invention.

An exemplary embodiment of a windshield 100 embodying the invention with a chirped hologram is shown in FIG. 9, and includes an inner glass layer 102, a zero-degree mirror hologram 104, a 2 mil thick layer 106 of optical adhesive such as that marketed as "Norland 61" adhesive, a 30 mil thick layer of PVB, and an outer glass layer 110. In fabricating the windshield 100, first the layer of adhesive 106 is applied to the hologram layer 104 by a conventional cast coating process using precise spacers. In such a process, the zero-degree hologram layer is mounted on a flat glass plate. Precise thickness spacers (e.g., 1 mil spacers) are placed in each of the four corners of the hologram. An optical adhesive, e.g., the "Norland 61" adhesive, is poured on the hologram layer, and a glass plate is placed on top of the adhesive and hologram. The glass plate will slowly settle, pushing out the adhesive as it settles, until it rests on the four spacers. What remains is a precise layer of optical adhesive. Once the adhesive is cured, the glass plate is removed. Then the adhesive 106 is UV cured for 10 seconds, then baked at 100° C. for one hour. The hologram 104 with its adhesive overlayer 106 is roll-laminated to the inner glass layer 102, with the hologram side facing the glass. Then the PVB layer 108 and outer glass layer 110 are added, and the sandwich goes through a normal windshield autoclave process.

New holographic films are being developed that can be used to expose a single zero-degree mirror hologram in the ultraviolet, chirp the hologram by selectively swelling it using an optical adhesive such as that marketed under the tradename "Norland 61" or some other swelling film, and result in a high efficiency hologram reflecting from 390–540 nm. The film is exposed using an ultraviolet laser with a laser line between 350 nm and 400 nm, or an argon laser with a laser line in the low blue, and for an incident angle T nearly equal to zero.

The ideal hologram 56 reflects strongly from 390 nm–540 nm at normal incidence (peak wavelength at 465 nm), and the reflection peak wavelength gradually drops with increasing incident angle, according to eq. 1 below. The reflectivity of visible light is maximum at 0 degrees and monotonically decreases to a low value at 68 degrees. Therefore, the hologram 56 blocks a substantial portion of visible sunlight that would otherwise pass through the windshield 50 and reflect off the vehicle dashboard 62. The portion of visible sunlight that does reflect off the dashboard toward the windshield 50 which could enter the driver's eyebox 64 if reflected by the windshield does not reflect appreciably off the hologram 56 because the hologram reflection peak is in the ultraviolet (UV) region at high off-axis angles.

For light reflecting off the dashboard 62, off the windshield 50, and into the driver's eyebox 64, the light is incident on the windshield 50 and hologram 56 at a high enough angle that the reflection peak occurs at a peak wavelength in the ultraviolet. Since a human cannot see the ultraviolet light reflected from the hologram 56, and since the reflectance drops down to a low value in the visible, the amount of visible reflected light is small. Furthermore, because the hologram peak wavelength is in the ultraviolet region at high angles, the visible seethrough to the road ahead is not appreciably discolored and the luminous transmittance at the viewing angle, i.e., the angle that the driver's line of sight makes with the windshield relative to normal incidence, is only slightly lower with the hologram in place than if there were no hologram in place; i.e., only an inner and outer singlet and a PVB layer. Ideally, one of the two singlets is tinted, preferably the outer singlet. At the driver's line of sight, the order of windshields from most transmissive to least transmissive, are: tinted singlet/PVB/clear singlet, tinted singlet/PVB/veiling glare reduction hologram/clear singlet, tinted singlet/PVB/tinted singlet.

At the driver's line of sight through the windshield to the road in the distance, the reflection peak has a peak wavelength in the ultraviolet. Therefore, of the light from the road which is incident on the windshield, only the UV light component is reflected. Nearly all the visible light passes through to the driver. Therefore, the color of transmitted light is virtually unchanged. The net effect is to reduce veiling glare without discoloring the seethrough. The windshield can be made to be at least 60% transmissive at the viewing angle, i.e., the angle that the line of sight from the driver to the road makes with the windshield relative to normal incidence.

The relationship between the hologram peak wavelength $\lambda_{po}$ at normal incidence and the hologram peak wavelength $\lambda_p$ at the viewing angle $\Theta_e$ (in air) is:

$$\lambda_p = \lambda_{po} \cos \Theta_i \tag{1}$$

where $\Theta_i$ is the incident angle relative to normal inside the hologram and is given by:

$$\Theta_i = \sin^{-1}[\sin(\Theta_e)/n] \tag{2}$$

where n is the average refractive index of the hologram. For example, if n=1.512 (DuPont photopolymer holograms) and $\Theta_e = 75°$, then if $\lambda_p = 400$ nm, $\lambda_{po}$ will equal 520 nm. The peak wavelength shift is enough that an appreciable portion of the visible spectrum can be reflected at normal incidence without interfering with viewing at the viewing angle. The off-axis shift in peak wavelengths increases as the average index of the hologram increase.

Two added benefits of this invention are (1) reduced thermal radiation entering the vehicle, and (2) reduced UV light hitting the dashboard. The first benefit makes the car cooler and reduces the required air conditioning, and the second benefit prolongs the lifetime of the dashboard before it cracks. The function of the hologram 56 can be combined with other holographic functions, e.g., telltale displays.

It is understood that the above-described embodiments are merely illustrative of the possible specific embodiments which may represent principles of the present invention. For example, the zero-degree mirror reflection hologram could be attached to an external surface of the windshield rather than sandwiched between the singlets, and still control veiling glare, although the hologram would be subject to abrasion when exposed in that manner. Other arrangements may readily be devised in accordance with these principles by those skilled in the art without departing from the scope and spirit of the invention.

What is claimed is:

1. A veiling glare holographic windshield for vehicles, comprising:
    inner and outer windshield singlets;
    a zero-degree mirror reflection hologram disposed between said two singlets, said hologram having a high reflectance zone in the visible spectral range at normal incidence; and
    wherein said reflection hologram is characterized by a hologram reflection peak which is in the ultraviolet range at high off-axis angles of incidence.

2. The windshield of claim 1 wherein at least one of said windshield singlets is fabricated from a tinted glass singlet material.

3. The windshield of claim 1 wherein said reflection hologram is characterized by a reflection bandwidth at normal incidence of at least 100 nm.

4. The windshield of claim 3 wherein said reflection bandwidth at normal incidence extends between about 390 nm to about 540 nm.

5. The windshield of claim 1 wherein said hologram reflects light strongly in the wavelength range from about 390 nm to about 540 nm at normal incidence, and the reflection peak wavelength gradually decreases with increasing angles of incidence.

6. The windshield of claim 1 wherein said reflection hologram is fabricated from a photopolymer film.

7. The windshield of claim 1 further comprising a layer of polyvinyl butyral (PVB) disposed adjacent said outer windshield singlet, and a polyvinyl alcohol barrier layer disposed between said PVB layer and said hologram.

8. The windshield of claim 1 wherein said reflection hologram is further characterized by a fringe spacing which increases monotonically from one side of said hologram to the other side.

9. A veiling glare holographic windshield assembly for vehicles comprising a dashboard, comprising:

a transparent windshield disposed at an acute angle relative to said dashboard;

a zero-degree mirror reflection hologram having first and second opposed surfaces and applied to said windshield, said hologram characterized by fringes extending parallel to said surfaces, said hologram having a high reflectance zone in the visible spectral range at normal incidence to said windshield and a hologram reflection peak which is in the ultraviolet range at high off-axis angles of incidence.

10. The windshield assembly of claim 9 wherein said reflection hologram is further characterized by a reflection bandwidth of at least 100 nm.

11. The windshield assembly of claim 10 wherein said reflection bandwidth of said hologram at normal incidence extends between about 390 nm to about 540 nm.

12. The windshield assembly of claim 9 wherein said hologram reflects light strongly in the wavelength range from about 390 nm to about 540 nm at normal incidence, and the reflection peak wavelength gradually decreases with increasing angles of incidence.

13. The windshield assembly of claim 9 wherein said reflection hologram is fabricated from a photopolymer film.

14. The windshield assembly of claim 9 wherein said windshield comprises inner and outer windshield singlets, and said hologram is disposed between said windshield singlets.

15. The windshield assembly of claim 14 further comprising a layer of polyvinyl butyral (PVB) disposed adjacent said outer windshield singlet, and a polyvinyl alcohol barrier layer disposed between said PVB layer and said hologram.

16. The windshield assembly of claim 9 wherein said hologram comprises opposed surfaces and is characterized by a fringe spacing which increases monotonically from one surface of said hologram to the other.

17. A veiling glare holographic windshield for vehicles, comprising:

inner and outer windshield singlets;

a zero-degree mirror reflection hologram disposed between said two singlets, said hologram having a high reflectance zone in the visible spectral range at normal incidence; and wherein said reflection hologram is further characterized by a fringe spacing which increases monotonically from one side of said hologram to the other side.

18. The windshield of claim 17 wherein at least one of said windshield singlets is fabricated from a tinted glass singlet material.

19. The windshield of claim 17 wherein said reflection hologram is characterized by a reflection bandwidth at normal incidence of at least 100 nm.

20. The windshield of claim 19 wherein said reflection bandwidth at normal incidence extends between about 390 nm to about 540 nm.

21. The windshield of claim 17 wherein said hologram reflects light strongly in the wavelength range from about 390 nm to about 540 nm at normal incidence, and the reflection peak wavelength gradually decreases with increasing angles of incidence.

22. The windshield of claim 17 wherein said reflection hologram is characterized by a hologram reflection peak which is in the ultraviolet range at high off-axis angles of incidence.

23. The windshield of claim 17 wherein said reflection hologram is fabricated from a photopolymer film.

24. The windshield of claim 17 further comprising a layer of polyvinyl butyral (PVB) disposed adjacent said outer windshield singlet, and a polyvinyl alcohol barrier layer disposed between said PVB layer and said hologram.

* * * * *